United States Patent [19]

Treybig et al.

[11] Patent Number: 5,151,485

[45] Date of Patent: Sep. 29, 1992

[54] ADVANCED EPOXY COMPOSITIONS, CURABLE COMPOSITIONS AND CURED PRODUCTS

[75] Inventors: Duane S. Treybig; David S. Wang; Pong S. Sheih; Loan A. Ho, all of Lake Jackson, Tex.

[73] Assignee: The Dow Chemical Company, Midland, Mich.

[21] Appl. No.: 785,380

[22] Filed: Oct. 30, 1991

Related U.S. Application Data

[62] Division of Ser. No. 616,506, Nov. 21, 1990, Pat. No. 5,095,050.

[51] Int. Cl.$^5$ .................. C08G 59/06; C08G 59/18
[52] U.S. Cl. ............................................. 528/87
[58] Field of Search ........................................ 528/87

[56] References Cited

U.S. PATENT DOCUMENTS 3,488,404  1/1970  Parker ........................ 525/482
4,758,636  7/1988  Hijikata et al. ............. 525/438

Primary Examiner—Melvyn I. Marquis
Assistant Examiner—Christopher P. Rogers

[57] ABSTRACT

Compositions are prepared by the reaction of (A) an advanced composition resulting from reacting (1) at least one of (a) at least one epoxidized triglyceride of a fatty acid, or (b) at least one epoxidized fatty acid having an average of more than one unsaturated group per molecule or (c) at least one diepoxyalkane, or (d) any combination of any two or more of (a), (b) or (c), or (e) a combination of any one or more of (a), (b) or (c) and (f) a diglycidyl ether of a dihydric phenol; with (2) a dihydric phenol; (B) optionally a monohydric phenol; (C) a phosphorous-containing compound; and (D) optionally a base. These compositions can be cured with curing agents which react with aliphatic hydroxyl groups.

2 Claims, No Drawings

ADVANCED EPOXY COMPOSITIONS, CURABLE COMPOSITIONS AND CURED PRODUCTS

CROSS-REFERENCE TO RELATED APPLICATION

This is a divisional of application Ser. No. 07/616,506 filed Nov. 21, 1990 U.S. Pat. No. 5,095,050.

FIELD OF THE INVENTION

The present invention pertains to advanced compositions prepared from polyepoxides and dihydric phenols; to curable compositions containing these advanced compositions and to cured products prepared from these curable compositions.

BACKGROUND OF THE INVENTION

Epoxy resins have been employed in coating compositions for many years. They have almost exclusively been applied in the form of powder coatings or organic solvent solutions. Because of environmental concerns, there has been a move to reduce the amount of organic solvents in those coatings applied by spraying, dipping, electrodeposition, rolling, flow coating, and the like.

One such attempt has been in the area of epoxy phosphate ester coatings as disclosed by Martin in U.S. Pat. No. 4,164,487, Campbell et al. in U.S. Pat. No. 4,397,970 and Ring et al. in U.S. Pat. No. 4,508,765. While the coatings offered by Martin, Campbell et al. and Ring et al. reduce or eliminate the use of organic solvents in liquid applied coating compositions by the use of waterborne coatings utilizing water miscible or water soluble epoxy compositions, the resultant coatings could stand an improvement in some of it properties such as blush after being subjected to steam pasteurization treatments and in formability as evidenced by reverse impact properties and in flexibility as evidenced by T-bend. The higher the reverse impact value of the coating, the better the formability characteristics of the coating. The lower the T-bend value of the coating, the better the flexibility characteristics of the coating.

It would therefore be desirable to have available, epoxy based liquid coatings which have: (a) reduced amounts of organic solvents, or (b) an improvement in one or more of its thermal or physical properties, particularly blush resistance, reverse impact and/or T-bend flexibility.

SUMMARY OF THE INVENTION

One aspect of the present invention concerns a composition comprising the reaction product of (A) an advanced composition resulting from reacting (1) at least one of (a) at least one epoxidized triglyceride of a fatty acid, or (b) at least one epoxidized fatty acid having an average of more than one unsaturated group per molecule or (c) at least one diepoxyalkane, or (d) any combination of any two or more of (a), (b) or (c), or (e) a combination of any one or more of (a), (b) or (c) and (f) a diglycidyl ether of a dihydric phenol; with (2) a dihydric phenol; and (B) optionally a monohydric phenol.

Another aspect of the present invention concerns a composition comprising the reaction product of (A) an advanced composition resulting from reacting (1) at least one of (a) at least one epoxidized triglyceride of a fatty acid, or (b) at least one epoxidized fatty acid having an average of more than one unsaturated group per molecule or (c) at least one diepoxyalkane, or (d) any combination of any two or more of (a), (b) or (c), or (e) a combination of any one or more of (a), (b) or (c) and (f) a diglycidyl ether of a dihydric phenol; with (2) a dihydric phenol; (B) optionally a monohydric phenol; and (C) a phosphorus-containing compound.

Another aspect of the present invention concerns organic solvent-borne compositions comprising the aforementioned compositions dissolved in one or more organic solvents.

Another aspect of the present invention concerns a composition comprising the reaction product of (A) an advanced composition resulting from reacting (1) at least one of (a) at least one epoxidized triglyceride of a fatty acid, or (b) at least one epoxidized fatty acid having an average of more than one unsaturated group per molecule or (c) at least one diepoxyalkane, or (d) any combination of any two or more of (a), (b) or (c), or (e) a combination of any one or more of (a), (b) or (c) and (f) a diglycidyl ether of a dihydric phenol; with (2) a polyhydric phenol; (B) optionally a monohydric phenol; (C) a phosphorus-containing compound; and (D) a base.

Another aspect of the present invention concerns water-borne compositions comprising the aforementioned compositions dispersed or dissolved in water.

A further aspect of the present invention concerns curable compositions comprising (I) a composition comprising the reaction product of (A) an advanced composition resulting from reacting (1) at least one of (a) at least one epoxidized triglyceride of a fatty acid, or (b) at least one epoxidized fatty acid having an average of more than one unsaturated group per molecule or (c) at least one diepoxyalkane, or (d) any combination of any two or more of (a), (b) or (c), or (e) a combination of any one or more of (a), (b) or (c) and (f) a diglycidyl ether of a dihydric phenol; with (2) a polyhydric phenol; (B) optionally a monohydric phenol; and (C) a phosphorus-containing compound; and (11) a curing quantity of a suitable curing agent for component (1).

A further aspect of the present invention concerns organic solvent-borne curable compositions comprising the aforementioned compositions dissolved in one or more organic solvents.

A further aspect of the present invention concerns curable compositions comprising (1) a composition comprising the reaction product of (A) an advanced composition resulting from reacting (1) at least one of (a) at least one epoxidized triglyceride of a fatty acid, or (b) at least one epoxidized fatty acid having an average of more than one unsaturated group per molecule or (c) at least one diepoxyalkane, or (d) any combination of any two or more of (a), (b) or (c), or (e) a combination of any one or more of (a), (b) or (c) and (f) a diglycidyl ether of a dihydric phenol; with (2) a polyhydric phenol; (B) optionally a monohydric phenol (C) a phosphorus-containing compound; and (D) a base; and (II) a curing quantity of a suitable curing agent for component (I).

Another aspect of the present invention concerns water-borne curable compositions comprising the aforementioned compositions dispersed or dissolved in water.

A further aspect of the present invention pertains to products resulting from curing the aforementioned curable compositions.

A still further aspect of the present invention pertains to articles coated with the aforementioned curable compositions which have been cured subsequent to being coated onto said articles.

The present invention provides liquid epoxy based coatings which have an improvement in one or more of its thermal or mechanical or physical properties, particularly an improvement in one or more of the properties selected from blush resistance, reverse impact and T-bend flexibility.

DESCRIPTION OF THE INVENTION

Definitions

The term "dihydric phenol" means any compound which has an average of about 2 aromatic hydroxyl groups per molecule.

The term "monohydric phenol" means any compound which contains only one aromatic hydroxyl group per molecule.

The term "water-borne" means that the resin composition is miscible, soluble or dispersible in water.

Preparation of Advanced Resin Compositions

The advanced resin compositions employed in the present invention can be prepared by reacting the polyhydric phenol with the epoxy-containing compound in the presence of a suitable catalyst at a temperature of from about 90° C. to about 280° C., preferably from about 120° C. to about 250° C., more preferably from about 150° C. to about 240° C., for a time sufficient to complete the advancement reaction, usually from about 0.025 to about 48, preferably from about 0.3 to about 12, more preferably from about 0.5 to about 8 hours.

At temperatures below about 90° C., little or no reaction occurs.

At temperatures above about 280° C., gelation of the reaction mixture or decomposition occurs.

The epoxide-containing compound and the polyhydric phenol are employed in amounts which provide a ratio of phenolic hydroxyl groups per epoxide group of from about 0.01:1 to about 5:1, preferably from about 0.1:1 to about 2:1, more preferably from about 0.3:1 to about 1.1:1.

When the ratio of phenolic hydroxyl groups per epoxide group is less than 1:1, the resulting advanced resin is predominately terminated in epoxy groups. When the ratio of phenolic hydroxyl groups per epoxide group is greater than 1:1, the resulting advanced resin is predominately terminated in phenolic hydroxyl groups. When the ratio of phenolic hydroxyl groups per epoxide group is substantially 1:1, the resulting advanced resin is randomly terminated in either epoxy groups or phenolic hydroxyl groups.

The advanced epoxy resins are optionally reacted with a monohydric phenol or the advanced epoxy resin is prepared in the presence of a monohydric phenol.

The monohydric phenol is employed so as to control the quantity of epoxide groups available for reaction with the phosphorus compound. When an epoxy resin molecule containing three or more epoxide groups is reacted with a phosphorus compound, a high viscosity product or gelation may result. Reaction of an epoxy resin containing three or more epoxide groups per molecule with a monohydric phenol reduces the quantity of epoxide groups available for reaction with the phosphorus compounds, thereby desirably reducing the viscosity or preventing gellation.

The monohydric phenol is employed in amounts which provides a ratio of phenolic hydroxyl groups per epoxide group of from about 0:1 to about 0.96:1, preferably from about 0.5:1 to about 0.96:1, more preferably from about 0.75:1 to about 0.96:1.

The phosphorus compound is reacted with the advanced epoxy resin at temperatures of from about 25° C. to about 160° C., preferably from about 70° C. to about 135° C., more preferably from about 100° C. to about 125° C. for a time sufficient to complete the reaction, usually from about 0.02 to about 48, preferably from about 0.5 to about 6, more preferably from about 0.5 to about 2 hours.

At temperatures below about 25° C., the reaction is too slow to be practical.

At temperatures above about 160° C., side reaction, as between an alcohol reaction medium and the phosphoric acid) detrimental to use of the end products as a coating occur.

The phosphorus compound is employed in amounts which provide a ratio of moles of phosphorus compound per epoxide equivalent of from about 0.02:1 to about 0.7:1, preferably from about 0.05:1 to about 0.4:1, more preferably from about 0.08:1 to about 0.25:1.

When the phosphorus compound is employed in amounts which result in a ratio of moles of phosphorus compound per epoxide group of less than about 0.02:1, unstable water-borne phosphate ester dispersions usually result.

When the phosphorus compound is employed in amounts which result in a ratio of moles of phosphorus compound per epoxide group of greater than about 0.7:1, the properties of the uncured or cured product resin are usually undesirable.

The phosphorus compound forms the mono-, di- and triesters with the epoxy resin. If desired, water can be employed so as to hydrolyze the di- and triesters to the monoester. Also, a sufficient amount of water can also be employed so as to hydrolyze some or all of the epoxide groups to form α-glycol groups. The water is reacted at a temperature of from about 90° C. to about 150° C., preferably from about 90° C. to about 130° C., more preferably from about 115° C. to about 125° C. for a time sufficient to complete the reaction, usually from about 0.05 to about 10, preferably from about 1 to about 5, more preferably from about 1 to about 2 hours.

The amount of water employed in the hydrolysis step varies from about zero to about 3, preferably from about 1 to about 2 parts by weight per one hundred parts by weight (phr) of resin.

Suitable catalysts which can be employed to catalyze the reaction between a phenolic hydroxyl group and a vicinal epoxide group include, for example, tertiary amines such as, triethylamine, tripropylamine, tributylamine. 2-methylimidazole, N-methylmorpholine, combinations thereof and the like; quaternary ammonium compounds such as, benzyl trimethyl ammonium chloride, tetrabutylammonium chloride, combinations thereof and the like; phosphines such as triphenylphosphine, tributylphosphine, trilaurylphosphine, trichlorobutylphosphine, trinaphthylphosphine, and the like; and phosphonium compounds such as, ethyltriphenylphosphonium chloride, ethyltriphenylphosphonium bromide, ethyltriphenylphosphonium iodide, ethyltriphenylphosphonium phosphate, ethyltriphenylphosphonium acetate.acetic acid complex, tetrabutylphosphonium chloride, tetrabutylphosphonium bromide, tetrabutylphosphonium iodide, tetrabutylphosphonium phosphate, tetrabutylphosphonium acetate.acetic acid complex, butyltriphenylphosphonium tetrabromobisphenate, butyltriphenylphosphonium bisphenate, butyltriphenylphosphonium bicarbonate, combinations thereof and the like; alkali metal hydroxides such as, sodium:hydroxide, potassium hydroxide, lithium hydroxide, combinations thereof and the like.

These catalysts are employed in catalytic amounts and the particular amount depends upon the particular reactants and catalyst being employed. However, usually the amount is from about 0.0001 to about 10, preferably from about 0.05 to about 1, more preferably from about 0.1 to about 0.5 percent by weight based upon the weight of the epoxy resin.

Epoxidized Triglycerides of Fatty Acids

Suitable epoxidized triglycerides of fatty acids which can be employed herein include those containing an average of more than one epoxide group per molecule. These epoxidized triglycerides of fatty acids can be represented by the following formula I

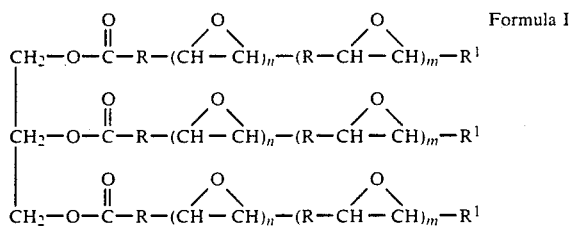

Formula I where R is a divalent saturated or unsaturated aliphatic or cycloaliphatic hydrocarbon group or hydroxy substituted aliphatic or cycloaliphatic hydrocarbon group having from 1 to about 30, preferably from 1 to 10 carbon atoms; each R! is independently hydrogen, an alkyl, alkene, hydroxy substituted alkyl or hydroxy substituted alkene groups having from 1 to about 20, preferably from 1 to 10, more preferably from 1 to 6, carbon atoms; n is 0 to 2 with the proviso that all three n's in the above structure are not 0 at the same time; and m is 0 to 5.

The epoxidized triglycerides of fatty acids are prepared by epoxidizing the reactive olefin groups of the naturally occurring triglyceride oils. The olefin group can be epoxidized with any number of peracids, especially perbenzoic, peracetic, m-chloroperbenzoic and trifluoroperacetic acid as described in "Advanced Organic Chemistry" 2nd Edition by Jerry March, McGraw-Hill Book Company, 1977, p. 750 and in U.S. Pat. No. 3,488,404 by Phillip Parker all of which are incorporated herein by reference. The olefin group may also be epoxidized with very dilute hydrogen peroxide in the presence of the two-component association consisting of tungstate and phosphate (or arsenate) ions according to the technique of phase transfer catalysis as described in the J. Org. Chem. 1983, vol. 48, pp. 3831–3833 by C. Venturello, E. Alneri and M. Ricci.

The epoxidation of the olefin group can be carried out at a temperature suitably from about 0° C. to 70° C., preferably from about 25° C. to 50° C. for a time sufficient to complete the reaction, usually from 15 minutes to 20 hours.

At temperatures below about 0° C., the reaction occurs slowly.

At temperatures above about 70° C., the carboxylic acid generated from the peracid and olefin reaction reacts with the epoxide group forming a hydroxy ester group.

Particularly, suitable epoxidized triglycerides of fatty acids include, for example, epoxidized: soybean oil, linseed oil, castor oil, coconut oil, corn oil, cottonseed oil, peanut oil, sunflower oil, tung oil, lequerella oil, any combination thereof and the like. The preferred epoxidized triglycerides of fatty acids include, for example, epoxidized: soybean oil, linseed oil, or any combination thereof and the like.

The most preferred epoxidized triglyceride of a fatty acid and which occurs naturally is vernonia oil, which is predominately about 80% epoxidized triglyceride of vernonia acid.

Epoxidized fatty acids having an average of more than one epoxide group per molecule Suitable epoxidized fatty acids which can be employed herein include those epoxidized fatty acids having an average of more than one epoxidizable ethylenically unsaturated group per molecule. Suitable epoxidized fatty acids include, for example, epoxidized: linoleic acid, 2,4-hexadienoic acid, licanic acid, linolenic acid, arachidonic acid, muconic acid, retinoic acid, any combination thereof and the like. The preferred epoxidized fatty acids include, for example, epoxidized: linoleic acid, linolenic acid, arachidonic acid, licanic acid, any combination thereof and the like.

Diepoxyalkanes

Suitable diepoxyalkanes which can be employed herein include, for example, those represented by the following general formula II

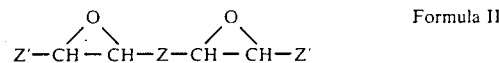

Formula II wherein Z is a direct bond, a divalent saturated or unsaturated aliphatic or cycloaliphatic hydrocarbon group having from 1 to about 30, preferably from about 4 to about 30, more preferably from about 14 to about 30 carbon atoms; and each Z' is independently hydrogen, an alkyl or alkene group having from 1 to about 20, preferably from 1 to about 2, more preferably 1, carbon atom(s). Particularly suitable diepoxyalkanes include, for example, 1,2:3,4-diepoxybutane, 1,2:5,6-diepoxyhexane, 1,2:7,8-diepoxyoctane, 1,2:8,9-diepoxynonane, 1,2:9,10-diepoxydecane, 1,2:13,14-diepoxytetradecane, 4,5:9,10-diepoxy-1-decene, any combination thereof and the like.

Dihydric Phenols

Suitable dihydric phenols which can be employed herein include any compound having two aromatic hydroxyl groups per molecule. Exemplary of such dihydric phenols include those represented by the following general formulas III or IV

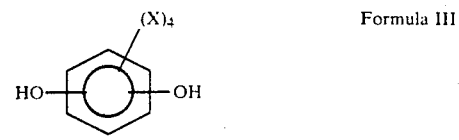

Formula III

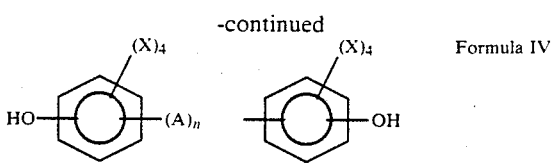

wherein each A is independently a divalent hydrocarbyl group having suitably from 1 to about 12, more suitably from 1 to about 6, most suitably from 1 to about 4, carbon atoms, —S—, —S—S—, —SO—, —SO$_2$—, —CO—O—, —O—CO—O—; each X is independently hydrogen, a hydrocarbyl or hydrocarbyloxy group having suitably from 1 to about 12, more suitably from 1 to about 6, most suitably from 1 to about 4, carbon atoms or a halogen atom, preferably chlorine or bromine; and n has a value of zero or 1.

The term hydrocarbyl as employed herein means any aliphatic, cycloaliphatic, aromatic, aryl substituted aliphatic or cycloaliphatic, or aliphatic or cycloaliphatic substituted aromatic groups. Likewise, the term hydrocarbyloxy means a hydrocarbyl group having an oxygen linkage between it and the carbon atom to which it is attached. The term divalent hydrocarbyl group refers to the aforementioned hydrocarbyl groups minus an additional hydrogen atom. Particularly suitable dihydric phenols include, for example, hydroquinone, resorcinol, catechol, bisphenol A, bisphenol F, bisphenol K, brominated or C$_1$-C$_4$ alkyl derivatives thereof, or any combination thereof and the like.

Diglycidyl Ethers of Dihydric Phenols

Suitable diglycidyl ethers of dihydric phenols which can be employed herein include the diglycidyl ethers of the aforementioned dihydric phenols. Particularly suitable diglycidyl ethers of dihydric phenols include, for example, the diglycidyl ethers of bisphenol A, bisphenol F, bisphenol K, brominated and C$_1$ to C$_4$ alkyl derivatives thereof, any combination thereof and the like.

Monohydric Phenols

Suitable monohydric phenols which can be employed herein include, for example, any compound having only one aromatic hydroxyl group per molecule. Exemplary of such monohydric phenols include, for example those represented by the following general formula V

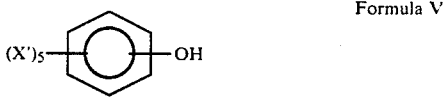

Formula V wherein each X' is independently hydrogen, a hydrocarbyl or hydrocarbyloxy group having suitably from 1 to about 12, more suitably from 1 to about 6, most suitably from 1 to about 4, carbon atoms; a nitro (—NO$_2$) group or a halogen atom, preferably chlorine or bromine. Particularly suitable monohydric phenols include, for example, phenol, o-cresol, p-cresol, nonylphenol, chlorophenol, dichlorophenol, trichlorophenol, pentachlorophenol, bromophenol, dibromophenol, tribromophenol, trifluoro-m-cresol, 3-ethylphenol, 4-ethylphenol, 3-isopropylphenol, 4-n-propylphenol, 4-isopropylphenol, 3-tert-butylphenol, 4-sec-butylphenol, 4-tert-butylphenol, p-tert-amylphenol, 4-n-butoxyphenol, 4-heptyloxyphenol, 3,5-tert-butylphenol, 4-(tert-octyl)phenol, 3-n-pentadecylphenol, o-methoxyphenol, m-methoxyphenol 2-methoxy-4-methylphenol 4-ethyl-2-methoxyphenol, 3,4-methylenedioxyphenol, any combination thereof and the like.

Reaction Solvents

Suitable solvents which can be employed in the reaction of the advanced epoxy resin with the phosphorus-containing compound and subsequently a base includes for example, glycol ethers, glycol esters, alcohols, ketones or any combination thereof. Particularly suitable such solvents include, for example, 2-butoxyethanol, diethylene glycol monopropyl ether, diethylene glycol monobutyl ether, diethylene glycol monohexyl ether, propylene glycol monopropyl ether, propylene glycol monobutyl ether, propylene glycol tertiary butyl ether, propylene glycol isopropyl ether, dipropylene glycol monobutyl ether, ethylene glycol phenyl ether, propylene glycol phenyl ether, 2,2,4-trimethyl-1,3-pentanediol monoisobutyrate, n-pentyl propionate, C$_6$ to C$_{13}$ alkyl acetates, butanol, acetone, methylethyl ketone, methyl isobutyl ketone, any combination thereof and the like.

Phosphorus Compound

Suitable phosphorus compounds which can be employed herein include, for example, those represented by the following general formula VI

Formula VI wherein R$^3$ is hydrogen or a hydrocarbyl group having suitably from 1 to about 20, preferably from 1 to about 8, more preferably from 1 to about 4 carbon atoms. Particularly suitable phosphorus containing compounds which can be employed herein include, for example, phospholic acid, super phosphoric acid, phosphorus pentoxide, butyl phosphate ester, butyl ether of ethylene glycol phosphate ester, any combination thereof and the like.

Base

The reaction product of the advanced epoxy resin or blends of the advanced epoxy resins with the phosphorus compounds can be neutralized with any base such that the neutralized product will be water thinnable. Suitable bases include, for example, the alkali metal hydroxides; oxides or hydroxides of alkaline earth metals: oxides or hydroxides of the metals which form phosphates or acid phosphates having measurable water solubilities, as such or as hydrates; complexes with ammonia, ammonia or ammonium hydroxide, and organic bases. Particularly suitable alkali metal hydroxides include, lithium, sodium and potassium hydroxides. Particularly suitable oxides or hydroxides of alkaline earth metals include oxides and hydroxides of beryllium and calcium. Particularly suitable oxides or hydroxides of other metals include oxides and hydroxides of copper and iron. Suitable organic bases include, for example, mono, di, and tertiary alkyl cycloalkyl and aromatic amines, polyalkylene polyamines, and the like. Particularly suitable organic bases include choline, guanidine, methylamine, n-butylamine, diethylamine, trimethylamine, diethylenetriamine, n-hexylamine, ethylenediamine, allylamine, cyclohexylamine, cycloheptylamine, aniline, N,N-diemthylaniline, diaminobenzenes, piperazine, morpholine, pyridine, hexamethylenimine, ethanolamine, N,N-dimethylethanolamine, diethylaminoethanol, diisopropanolamine, triisopropanolamine, 4-hydroxy-n-butylamine, 2-dimethylamino-2-methyl-1-propanol and the like. The preferred base is N,N-dimethylethanolamine.

Curing Agents

Those compositions which contain epoxy groups can be cured with conventional epoxy curing agents which cure by reaction with the epoxy groups. Suitable such curing agents include, aromatic or aliphatic or cycloaliphatic compounds containing an average of more than two primary or secondary amino hydrogen atoms per molecule; compounds having an average of more than two carboxyl groups per molecule: anhydrides of compounds containing two or more carboxyl groups per molecule; biquanides: guanadines; guanimines, amides and polyamides, imidazoles, aromatic hydroxyl-containing compounds: or any combination thereof and the like. Particularly suitable such curing agents include, for example, ethylenediamine, diethylenetriamine, triethylenetetramine, tetraethylenepentamine, isophoronediamine, N-aminoethylpiperazine, methanediamine, 1,3-diaminocyclohexane, xylylenediamine, m-phenylenediamine, 1,4-methylenedianiline, metaphenylenediamine, diaminodiphenylsulfone, diaminodiphenyl ether, 2,4-toluenediamine, 2,6-diaminopyridine, bis(3,4-diaminophenyl)sulfone resins prepared from aniline and formaldehyde, aminated polyglycols, oxalic acid, phthalic acid, maleic acid, aconitic acid, carboxyl terminated polyesters, phthalic anhydride, succinic anhydride, citraconic anhydride, itaconic anhydride, dodecenylsuccinic anhydride, Nadic Methyl Anhydride (methylbicyclo(2.2.1)heptene-2,3-dicarboxylic anhydride isomers), pyromellitic dianhydride, cyclopentanetetracarboxylic dianhydride, benzophenonetetracarboxylic dianhydride, dicyandiamide, 2-methylimidazole; or any combination thereof and the like. These compositions can also be cured with the following enumerated curing agents for curing compositions containing secondary aliphatic hydroxyl groups.

Those compositions which do not contain epoxy groups but only the secondary hydroxyl groups resulting from the reaction between the epoxy groups and the dihydric phenol can be cured with such curing agents as melamine-aldehyde resins, alkylated melamine-aldehyde resins, urea-aldehyde resins, alkylated urea-aldehyde resins, phenol-aldehyde resole resins, alkylated phenol-aldehyde resole resins, blocked polyisocyanates, any combination thereof and the like. Particularly suitable such curing agents include, for example, hexamethoxymethylmelamine, highly methylated melamine-formaldehyde resin, highly alkylated ethoxy methoxy melamine-formaldehyde resins, and highly alkylated methoxymethyl isobutoxymethyl melamine-formaldehyde resin commercially available from American Cyanamide Co. as CYMEL TM 303, CYMEL TM 325, CYMEL TM 1116, AND CYMEL TM 1161 respectively: melamine-formaldehyde resins commercially available from Monsanto Co. as RESIMENE TM 730 and RESIMENE TM 735; urea-formaldehyde resins commercially available from American Cyanamide Co. as BEETLE TM 60 and BEETLE TM 65; a mixture of the allyl ethers of mono-, di- and tri-methylol phenols, and a mixture of the allyl ethers of methylol phenol partially polymerized and phenol-formaldehyde synthetic resole resin commercially available from BTL Specialties Corp. as METHYLON TM 75-108, METHYLON TM 75-121 and VARCUM SYNTHETIC RESIN 29-101, respectively; 2-ethylhexanol blocked prepolymer of toluene diisocyanate and trimethylol propane; 2-ethylhexanol blocked prepolymer of diphenyl methane 4,4-diisocyanate; $C_3-C_{10}$ ketoxime blocked aromatic, aliphatic or cycloaliphatic polyisocyanates; any combination thereof and the like.

If desired, promoters or accelerators can be employed with the urea-aldehyde resins, alkylated urea-aldehyde resins, melamine-aldehyde resins, alkylated melamine-aldehyde resins, phenol-aldehyde resole resins, and alkylated phenol-aldehyde resole resins. Suitable such promoters or accelerators include, for example, phosphoric acid, polyphosphoric acid, maleic acid, citric acid, organic sulfonic acids, such as, benzene sulfonic acid, p-toluene sulfonic acid mixtures thereof and the like.

The curing agents are employed in amounts which will generally cure the advanced resin, i.e. that amount which is sufficient to render the resultant cured coating composition non-tacky. In those instances where the curing agent cures by reacting with the epoxide groups, they are employed in amounts which provide a ratio of equivalents of curing agent per epoxide group of from about 0.01:1 to about 10:1, preferably from about 0.1:1 to about 5:1, more preferably from about 0.5:1 to about 1.5:1. In those instances where the advanced resin cures through the secondary hydroxyl groups along the backbone, the curing agent is employed in amounts which provide a ratio of equivalents of curing agent per secondary hydroxyl group of from about 0.05:1 to about 5:1, preferably from about 0.1:1 to about 3:1, more preferably from about 0.3:1 to about 2:1.

If desired, the coating composition can be formulated with conventional additives. Suitable such additives include, for example, antifoam agents, flow control agents, slip agents, adhesion promoters, flexibility promoters, surface tension modifiers, stress release agents, gloss reducing materials, rheology modifiers, stabilizers, surfactants, coalescing solvents, reactive diluents, plasticizers and the like. A partial list of suitable additives, include for example, methacrylamide functional amine adduct of neopentyl(diallyl)oxy, tri(dioctyl)pyro-phosphato titanate which is commercially available from Kenrich Petrochemicals, Inc. as LICA TM 38J methacrylamide functional amine adduct of neopentyl(diallyl)oxy, tri(dioctyl)pyro-phosphato:zirconate which is commercially available from Kenrich Petrochemicals, Inc. as LZ 38J; a solution of polyether modified methyl alkyl polysiloxanes which is commercially available from BYK Chemie as BYK TM -321; a solution of polyether modified dimethyl polysiloxanes which is commercially available from BYKChemie as BYK TM -306; an acrylic polymer which is commercially available from BYK Chemie as BYK TM -361 and a silicone resin solution which is commercially available as SR882M from General Electric.

The amount of additive depends on the additive type, formulation, crosslinker (curing agent) concentration and type, and many other variables. As a consequence, the applicants do not wish to be bound by any particular concentration range. Typically additives are usually employed in amounts from 0.00001 to 10, preferably from 0.001 to 5, more preferably from 0.1 to 0.5 percent by weight based upon the weight of total solids. Plasticizers may be added in quantities of 10 to 40 percent by weight.

In the water-borne coatings, the resin and curing agent and other additives, if desired, are blended together with a sufficient amount of water to provide the composition with the desirable application viscosity. The amount of water employed will depend upon the viscosity of the blended components without the water. The higher viscosity compositions will require more water to reach the desired application viscosity than those compositions with lower viscosities.

The coating compositions can be pigmented and/or opacified with known pigments and opacifiers. For many uses, including food uses, the preferred pigment is titanium dioxide. Generally, the pigment is used in a pigment to binder ratio of from about 0.1:1 to about 1:1 by weight. Other pigments include, antimony oxide, zinc oxide, white lead, calcium carbonate, silica, aluminum silicate, any combination thereof and the like.

The coating compositions can be applied by any conventional method in the coating industry. Therefore, spraying, rolling, dipping, flow control or electrodeposition applications can be employed for both clear and pigmented films. Spraying is the preferred technique for the aqueous coating compositions. After application onto the substrate, the coating is thermally cured at temperatures of from about 95° C. to about 235° C. or higher, for periods in the range of from about 1 to 60 minutes. The resultant films can be dried at ambient temperatures for longer periods of time.

The following examples are illustrative of the invention, but are not to be construed as to limiting the scope thereof in any manner.

EXAMPLE 1

A. PREPARATION OF ADVANCED EPOXY RESIN FROM EPOXIDIZED SOYBEAN OIL AND BISPHENOL A

An epoxidized soybean oil (200.0 grams, 0.88 equivalent) having an epoxide equivalent weight (EEW) of 28.52, 51.91 grams (0.46 equivalent) of bisphenol A, 0.4286 grams of a 70% by weight solution in methanol of ethyltriphenylphosphonium acetate.acetic acid complex, and 0.08 gram of potassium hydroxide are added to a four neck 500 milliliter resin kettle equipped with a means for stirring and temperature control. The contents are heated with stirring to a temperature of 160° C. over a period of 45 minutes and maintained at 160° C. for a period of 8 hours. The resultant product has an EEW of 481 and a weight average molecular weight (MWw) of 12,383.

B. REACTION WITH PHOSPHORIC ACID

The advanced epoxy resin from A above having an epoxide equivalent weight of 481 (106.6 grams, 0.2216 equivalent) and 24.06 grams (0.2036 mole) of 2-butoxyethanol are added to a four neck 500 milliliter round bottom flask equipped with a means for temperature control, stirring with a steel stirrer shaft, condensing and reactant addition under a nitrogen purge of 62 cubic centimeters per minute. The epoxy resin-solvent blend is slowly dissolved by heating between 120° C. and 125° C. for a period of fourty-one minutes. During this time period, the nitrogen adapter which has no dip leg is replaced with one having a three inch dip leg. Then, 1.7406 grams phosphoric acid in 8.508 grams 2-butoxyethanol is added dropwise over a period of two minutes while maintaining the reaction temperature between 122° C. and 123° C. Since a rapid increase in molecular weight is apparent, 75.4 grams of 2-butoxyethanol is added to the reactor contents. Subsequently, the nitrogen flow is adjusted to 9 cubic centimeters per minute, and 2.2011 grams of deionized water is added to the reactor contents. Then, 58.8 grams of 2-butoxyethanol is added to the contents. The reactor contents are allowed to stir for a period of 126 minutes between 110° C. and 124° C. The resulting solution is allowed to cool. Then, 83.4 grams of 2-butoxyethanol is added to the solution to give a solution with a non-volatile content of 30 percent. The solution is filtered with a medium paint strainer with a 44×36 thread count. The viscosity which is measured with a Ford Cup No. 4 viscosity is 78 seconds.

C. PREPARATION OF COATING

Coatings are prepared by blending 39.797 grams of the solvent-borne solution prepared in Example 1B, with 1.829 grams CYMEL TM 325 (a highly methylated melamine-formaldehyde resin commercially available from American Cyanamid Company) to give a formulation containing 15.32 phr CYMEL TM 325 The formulation is applied to 24 gauge×4 inches×12 inches (0.66 mm×101.6 mm×304.8 mm) unpolished clean-treated cold rolled steel panels and degreased 7.5 mils×4.5 inches ×9.0 inches (0.19 mm×114.3 mm×228.6 mm) tin free steel panels with a No. 16 wire wound rod. All the panels are degreased by washing the panels in AROMATIC 100 solvent (a high purity narrow cut aromatic solvent having an initial boiling point of 152° C., a dry point of 174° C. and a flash point of 41° C., commercially available from Exxon Company, USA) followed by acetone and then drying in an oven at 400° F. (204.4° C.) for ten minutes. The coated panels are baked in an oven at 400° F. (204.4° C.) for 30 minutes. The thickness of the coating is between 0.20 and 0.24 mils (0.00508 mm and 0.006096 mm).

EXAMPLE 2

A. PREPARATION OF ADVANCED EPOXY RESIN FROM EPOXIDIZED SOYBEAN OIL AND BISPHENOL A

An epoxidized soybean oil (200.0 grams, 0.88 equivalent) having an epoxidized equivalent weight (EEW) of 228.52, 33.29 grams (0.29 equivalent) of bisphenol A. 0.4286 grams of a 70 percent by weight solution in methanol of ethyltriphenylphosphonium acetate.acetic acid complex, and 0.08 grams of potassium hydroxide are added to a reactor of the type described in Example 1. The contents are heated with stirring to a temperature of 160° C. over a period of 45 minutes and maintained at 160° C. for a period of 5 hours. The resultant product has an EEW of 421 and a MWw of 23,789.

B. REACTION WITH NONYLPHENOL AND PHOSPHORIC ACID

The advanced epoxy resin from A above having an epoxide equivalent weight of 421 (89.2 grams, 0.2119 equivalent), 44.3 grams (0.2010 mole) nonylphenol and 57.21 grams of 2-butoxyethanol are added to a reactor of the type described in Example 1B. The nitrogen flow is adjusted to 60 cubic centimeters per minute. The epoxy resin and nonylphenol are dissolved at a temperature between 110° C. and 121° C. for a period of twenty-nine minutes. Then, 0.3080 gram of a 70% by weight methanol solution of tetrabutylphosphonium acetate.acetic acid complex catalyst in 5.0320 grams 2-butoxyethanol is added dropwise to the reactor contents. Then, the reactor contents are heated between 153° C. and 155° C. for a period of ninety-three minutes. The reactor contents are cooled to 125° C. where 1.588 grams of 85% phosphoric acid in 7.818 grams of 2-butoxyethanol is added dropwise over a period of two minutes. The nitrogen adapter which has no dip leg is replaced with one having a three inch dip leg. The reactor contents are allowed to stir for a period of 134 minutes between 123° C. and 125° C. The nitrogen flow is adjusted to ten cubic centimeters per minute. Then, 2.7114 grams of water is added to the reactor contents. The reactor contents are allowed to stir for a period of 128 minutes while the temperature is maintained between 120° C. and 125° C. The light brown transparent liquid is cooled to ambient temperature to give a solution with a non-volatile content of 65 percent. The viscosity which is measured with a Ford Cup No. 4 is 73 seconds.

C. PREPARATION OF COATING

Coatings are prepared by blending 26.687 grams of the solution prepared in Example 2B, 6.763 grams of 2-butoxyethanol, 4.413 grams of METHYLON TM 75-108 (a mixture of the allyl ethers of mono-, di-, and tri-methylol phenols commercially available from BTL Specialty Resins Corp.) and 0.132 grams of 10% BYK 361 (an acrylic copolymer leveling additive commercially available from BYK Chemie USA) in 2-butoxyethanol to give a formulation containing 20.3 weight percent METHYLON TM 75-108. The formulation is applied to degreased 24 gauge×4 inches×12 inches (0.66 mm×101.6 mm×304.8 mm) unpolished clean-treated cold rolled steel panels and degreased 7.5 mils×4.5 inches ×9.0 inches (0.19 mm×114.3 mm×228.6 mm) tin free steel panels with a No. 16 wire wound rod according to ASTM D 4147-82. The panels are degreased by washing the panels in AROMATIC 100 solvent followed by acetone and then drying in an oven at 400° F. (204.4° C.) for thirty minutes. The coated panels are baked in an oven at 400° F. (204.4° C.) for 30 minutes. The thickness of the coating is between 0.18 and 0.25 mils (0.004572 mm and 0.00635 mm).

D. PREPARATION OF AQUEOUS DISPERSION

A portion of the light brown transparent solution from Example 2B (94.8 grams) is weighed into a reactor of the type described in Example 1B. The nitrogen flow is adjusted to 60 cubic centimeters per minute. The temperature is raised to 92° C. and an aqueous solution of N,N-dimethylethanolamine is added to the reactor contents over a period of three minutes. This solution is prepared by mixing 1.0918 grams N,N-dimethylethanolamine (0.0120 mole) in 50.8 grams deionized water. The light cream colored aqueous dispersion with a non-volatile content of 43 percent is allowed to cool to ambient temperature. Then, additional deionized water is added to the aqueous dispersion to give a dispersion with a non-volatile content of 34.5 percent. The viscosity which is measured with a Ford Cup No. 4 is 17.8 seconds.

E. PREPARATION OF COATING

Coatings are prepared by blending 36.92 grams of the aqueous dispersion prepared in Example 2D, 1.917 grams CYMEL TM 325 and 2.175 grams 2-butoxyethanol to give a formulation containing 15.05 phr CYMEL TM 325. The formulation is applied to degreased 24 gauge×4 inches ×12 inches (0.66 mm×101.6 mm×304.8 mm) unpolished clean-treated cold rolled steel panels and degreased 7.5 mils×4.5 inches×9.0 inches (0.19 mm×114.3 mm×228.6 mm) tin free steel panels with a No. 22 wire wound rod. The coated panels are baked in an oven at 400° F. (204.4° C.) for 20 minutes. The thickness of the coating is between 0.220 and 0.311 mils (0.005588 mm and 0.007899 mm).

COMPARATIVE EXPERIMENT A

A bisphenol A based epoxy resin having an epoxide equivalent weight of 1755 (110.0 grams, 0.0627 equivalent) and 21.75 grams (0.0184 mole) of 2-butoxyethanol are added to a reactor of the type described in Example 1B. The nitrogen flow is adjusted to 68 cubic centimeters per minute. The epoxy resin is slowly dissolved by heating between 121° C. and 127° C. for a period of twenty-one minutes. During this time period, the nitrogen adapter which has no dip leg is replaced with one having a three inch dip leg. Then, 1.243 grams (0.0108 mole) of 85% phosphoric acid in 5.257 grams 2-butoxyethanol is added dropwise over a period of four minutes while maintaining the reaction temperature between 121° C. and 123° C. The reactor contents are allowed to digest for a period of fifty-two minutes between 121° C. and 133° C. Then, 2.221 grams of deionized water is added to the reactor contents. After the temperature is maintained between 122° C. and 125° C. for a period of 121 minutes, the temperature is lowered to 80° C. Then an aqueous solution of N,N-dimethylethanolamine is added dropwise over an eight minute period while maintaining the temperature between 80° C. and 88° C. This solution is prepared by mixing 2.2255 grams N,N-dimethylethanolamine in 50.0 grams of water. Then, 128.5 grams of deionized water is added to the reactor contents over a twenty minute period while maintaining the reaction temperature between 82° C. and 91° C. The white aqueous dispersion with a non-volatile content of 35.3 percent is allowed to cool to ambient temperature. Then, 32.8 grams of water is added to the dispersion to give a dispersion having a non-volatile content of 32 percent and pH of 9.0. The viscosity which is measured with a Ford Cup No.4 is 17.9 seconds.

COMPARATIVE EXPERIMENT B

Coatings are prepared by blending 51.984 grams of the aqueous solution prepared in Comparative Example A, 1.676 grams CYMEL TM 325 2-butoxyethanol to give a formulation containing 10.075 phr CYMEL TM 325. The formulation is applied to degreased 24 gauge×4 inches×12 inches (0.66 mm×101.6 mm×304.8 mm) unpolished clean-treated cold rolled steel panels and degreased 7.5 mils×4.5 inches×9.0 inches (0.19 mm×114.3 mm×228.6 mm) tin free steel panels with a No. 16 wire wound rod. The panels are degreased by washing in AROMATIC 100 solvent followed by acetone and drying in an oven at 400° F. (204.4° C.). The coated panels are baked in an oven at 400° F. (204.4° C.) for 10 minutes. The thickness of the coating is between 0.24 and 0.29 mils (0.006096 mm and 0.007366 mm).

COMPARATIVE EXPERIMENT C

Coatings are prepared by blending 57.567 grams of the aqueous solution prepared in Comparative Experiment A, 2.802 grams of CYMEL TM 325 and 3.985 grams 2-butoxyethanol to give a formulation containing 15.2 phr CYMEL TM 325. The formulation is applied and cured as described in Comparative Experiment B.

The thickness of the coating is between 0.26 and 0.28 mils (0.006604 mm and 0.007112 mm).

COMPARATIVE EXPERIMENT D

Coatings are prepared by blending 45.214 grams of the aqueous dispersion prepared in Comparative Experiment A, 2.893 grams of CYMEL TM 325 and 3.348 grams 2-butoxyethanol to give a formulation containing 20.0 phr CYMEL TM 325. The formulation is applied and cured as described in Comparative Experiment B. The thickness of the coatings are between 0.27 and 0.28 mils (0.006858 mm and 0.007112 mm).

EXAMPLE 3 TESTING OF COATINGS

The coatings are evaluated according to the following procedures. The results are provided in Table I.

METHYL ETHYL KETONE (MEK) RESISTANCE

The resistance of the cured coating on a cold rolled steel panel to removal with methyl ethyl ketone is determined by rubbing across the baked panels a two pound ball pien hammer with the ball end covered with eight layers of cheesecloth which has been saturated with methyl ethyl ketone (MEK). No force is applied to the hammer other than that necessary to guide the hammer back and forth over the same area. A twelve inch ruler clamped into place is used to guide the hammer in the same path. The coated panels after rubbed are dipped into a mixture of 20% $CuSO_4.5H_2O$ and 10% concentrated hydrochloric acid in water for 30 seconds and then dipped into deionized water to determine breakthrough. A forward and reverse stroke returning to the starting point is considered as being one MEK double rub.

T-BEND

T-bend is used as a measure of the flexibility of the coating on the panel at a slow rate of deformation.

The edges of the cold rolled steel panel are cut to leave a two inch wide specimen of uniform thickness. A bend is made in the panel at approximately 0.75 inches from the end of the coated panel by using a fingerbrake. The bend is squeezed tight with the palm of the hand. Then the bent specimen is placed in a vice, which is previously taped with plastic tape to prevent scratching the substrate, and the panel is bent back on itself to form a 180 degree bend. The stressed area is then tested for adhesion by taping with Scotch 610 tape. The tape is applied in such a manner where no air bubbles are trapped under the tape. The tape is then pulled with a rapid and forceful fashion at a 90 degree angle in an attempt to pull the coating away from the substrate. Next the bend is dipped into a solution of copper sulfate (10 grams) in 1.0 N hydrochloric acid for 30 seconds and then dipped into deionized water. The purpose of this step is to oxidize any resulting bare metal in order to more accurately observe adhesion failures. The specimen is examined under a magnifying glass to determine failure. The first bend is noted as T0 (T zero) because there is no panel sandwiched between the bend. The process of bending the panel by using the fingerbrake and vice is continued until there is no sign of cracking or adhesion loss. Each successive bend is noted as T1, T2, T3, T4, etc. because of the number of layers of panel sandwiched between plys. The lower the number of T-bends, the better the flexibility.

IMPACT RESISTANCE

Impact resistance is used as a measure of the formability of the coating on the panel at a rapid rate of deformation.

Coated cold rolled steel panels are subjected to the impact of a falling weight from a Gardner Impact Tester at different calibrated heights ranging from 0 to 160 inch-pounds. The impacted area is then tested for adhesion by taping with Scotch 610 tape. The tape is applied in such a manner that no air bubbles are trapped under the tape. The tape is then pulled with a rapid and forceful fashion at a 90 degree angle in an attempt to pull the coating away from the substrate. Next, a solution of copper sulfate (10 grams) in 1.0 N hydrochloric acid (90 grams) is applied to the impacted area to check for failure. The specimen is examined under a table-top illuminated magnification system with lenses having a total of 11 diopter power to determine failure.

WEDGE BENDS

Wedge bend is used as a measure of the flexibility of the coating on the panel at a rapid rate of deformation. The coated tin free steel panels are cut to give specimens 4 inches by 2 inches. The specimens, coated side down, is placed under the ⅛ inch cylindrical mandrel of a Gardner Impact Tester. The specimen is slid to the rear of the mandrel platform until the edge is flush with two studs located at the rear of the platform. The remainder of the panel is raised at a uniform velocity to bend the specimen 170 to 180 degree in a time not to exceed 5 seconds. The spacer located under the impact platform is slid to the extreme front of the tester and tighten in place with the adjustment screws provided. This allows the impact platform to create a wedge that provides stress angles between 170 and 180 degrees. The bent specimen is placed under the impact platform. The longest segment of the specimen is placed downward. The specimen is subjected to the impact of the flat end of the impacter rod dropped from a calibrated height of 60 inch-pounds. The bent area is then tested for adhesion by taping with Scotch 610 tape. The tape is pulled with a rapid and forceful fashion from the edge of the most extreme bending at a 90 degree angle in an attempt to pull the coating away from the substrate. The bend is dipped into a solution of copper sulfate (10 grams) in 1.0 N hydrochloric acid and then dipped into deionized water. The distance of removed coating from the edge of the most severe bend outward to the edge with the least severe bend is measured in millimeters. Four replicate specimens are tested and averaged.

WATER PASTEURIZATION RESISTANCE

Water pasteurization resistance is performed on a single specimen for each coating to determine the permeability of the coating to water with pressure and heat. The coating substrate is tin free steel. The width of each specimen is about 12 centimeters while the length is about 6 centimeters. A mold and the Gardner Impacter Tester are used to form a semi-circular bend in each specimen. The semi-circular bend is used to simulate a stressed area. The dart impacter rod is dropped from 56 inch-pounds for all the specimens when forming the bend. The specimens are then placed in a Model 8100-TD NORCO Autoclave with deionized water for 90 minutes at 121° C. (250° F.) and 1 bar (15 psi) pressure. The clock is only started after both the desired temperature and pressure are reached. After the specimens are pasteurized for the prescribed conditions, the heat is turned off, the pressure bled off and the panels removed for testing. The coated specimens are submerged in deionized water after removal from the autoclave. The specimens are blotted dry after removal from the water with a paper towel. They are rated for blush and adhesion. The tested coatings are rated for blush by placing the specimens next to the panels from which the specimens are cut. The coatings are rated for blush according to the following scale:

| Rating | Description |
|--------|-------------|
| B1 | No blush |
| B2 | Dull, loss of luster |
| B3 | Total loss of luster |
| B4 | Blush, cloudy, starting to loose transparency |
| B5 | Cloudy, expanded coating, few bubbles, a little roughness |
| B6 | No longer clear, rough surface, bubbles |
| B7 | Very rough or cracked surface, many bubbles |

Adhesion is determined by using the tape test described in method A of ASTM 3359. The tape is Scotch 610 tape. X-cuts (cross-cuts) are made in the stressed and non-stressed areas of each specimen. The adhesion of the non-stressed specimen is listed first while the adhesion in the stressed area is listed second. The coatings are rated for adhesion according to the following scale:

| Rating | Description |
|--------|-------------|
| 5A | No peeling or removal of the coating. |
| 4A | Trace peeling or removal of the coating along incisions. |
| 3A | Jagged removal of the coating along most of the incisions up to 1/16 inch (1.6 mm) on either side of the incision. |
| 2A | Jagged removal of the coating along most of the incisions up to ⅛ inch (3.2 mm) on either side of the incision. |
| 1A | Removal of the coating from most of the area of the X under the tape. |
| 0A | Removal of the coating beyond the area of the X. |

EXAMPLE 4

A. PREPARATION OF ADVANCED EPOXY RESIN FROM 1,2,13,14-DIEPOXYTETRADECANE AND BISPHENOL A 1,2,13,14-Diepoxytetradecane (100 grams, 0.77 equivalent) having an EEW of 130.18, 77.45 grams (0.71 equivalent) of bisphenol A, 0.2143 grams of a 70% by weight solution in methanol of ethyltriphenylphosphonium acetate.aceticacid complex catalyst and 0.04 grams of potassium hydroxide are added to a four neck 500 milliliter resin kettle equipped with means for stirring and temperature control. The contents are heated with stirring to a temperature of 170° C. over a period of 30 minutes. The contents are allowed to exotherm to a temperature of 195° C. after which the contents are cooled to a temperature of 185° C. and maintained at 185° C. for a period of 150 minutes. The resultant product has an EEW of 2,096 and weight average molecular weight (MWw) of 8,471.

B. PREPARATION OF AQUEOUS DISPERSION

The advanced epoxy resin from Example 4A having an EEW of 2096 (110 grams, 0.0525 equivalent) and 21.86 grams (0.185 mole) of 2-butoxyethanol are added to a four neck 500 milliliter round bottom flask equipped with a means for temperature control, stirring with a steel stirrer shaft, condensing and reactant addition under a nitrogen purge of 69 cubic centimeters per minute. The epoxy resin is slowly dissolved by heating between 119° C. and 127° C. for a period of thirty-six minutes. During this time period, the nitrogen adapter which has no dip leg is replaced with one having a three inch dip leg. Then, 1.1435 grams of 85% phosphoric acid in 5.6450 grams ethylene glycol n-butyl ether is added dropwise over a period of 8 minutes while maintaining the reaction temperature between 123° C. and 125° C. The reactor contents are allowed to digest for a period of 2 hours at 125° C. Then, the nitrogen flow is adjusted to 2 cubic centimeters per minute and 2.2256 grams of deionized water is added to the reactor contents. After the temperature is maintained between 114° C. and 125° C. for a period of 2 hours, the temperature is lowered to 84° C. and the nitrogen flow is increased to 60 cubic centimeters per minute. Then an aqueous solution of N,N-dimethylethanolamine is added dropwise over a period of 9 minutes. This solution is prepared by mixing 2.0396 grams N,N-dimethylethanolamine and 50 grams of water. Then 160.4 grams of deionized water is added to the reactor contents over a twenty minute period while maintaining the tempera-

TABLE I

| Coating | CYMEL TM 325 phr | MEK DR | T-Bend | Rev. Impact In.-Lb. | | Avg. Wedge Bends (mm) | Water Pasteurization | |
|---------|------------------|--------|--------|---------------------|------|----------------------|----------------------|-------|
|         |                  |        |        |                     | J    |                      | Adhesion | Blush |
| Ex. 1C  | 15.32            | 18     | T2     | 80                  | 9.0  | 30.625               | 5A, 5A[a] | B1 |
| Ex. 2C  | 20.3[b]          | 4      | T3     | 136                 | 15.4 | 15.4                 | 5A, 5A    | B1 |
| Ex. 2E  | 15.05            | 9      | T4     | 80                  | 9.0  | 32.4                 | 5A, 5A    | B1 |
| C.E. B* | 10.1             | 10     | T3     | 92                  | 10.4 | 20.0                 | 5A, 5A    | B7 |
| C.E. C* | 15.2             | 45     | T2     | 88                  | 9.9  | 20.5                 | 5A, 5A    | B7 |
| C.E. D* | 20.7             | 200    | T3     | 64                  | 7.2  | 27.1                 | 5A, 5A    | B7 |

*Not an Example of the present invention.
[a]First value is at unstressed part of coupon; second value is at stressed part of coupon.
[b]Formulated with 20.3 percent METHYLON TM 75-108 as a curing agent instead of CYMEL TM 325 and 0.061 percent BYK 36.

ture between 80° C. and 95° C. The white aqueous dispersion with a non-volatile content of 32 percent is allowed to cool to ambient temperature. Additional deionized water is added to give a dispersion with a non-volatile content of 25 percent and pH of 8.8. The viscosity which is measured with a Ford Cup No. 4 is 21.8 seconds.

C PREPARATION OF COATING

Coatings are prepared by blending 54.505 grams of the aqueous dispersion prepared in Example 4B, 1.400 grams of CYMEL TM 325 and 0.8719 grams 2-butoxyethanol to give a formulation containing 10.27 parts per hundred resin (phr) CYMEL TM 325 The formulation is applied to degreased 24 gauge×4 inches×12 inches (0.66 mm×101.6 mm×304.8 mm) unpolished cleantreated cold rolled steel panels and degreased 7.5 mils×4.5 inches ×9.0 inches (0.19 mm×114.3 mm×228.6 mm) tin free steel panels with a No. 16 wire wound rod according to ASTM D 4147-82. The panels are degreased by washing the . panels in AROMATIC 100 solvent followed by acetone and drying in an oven at 400° F. (204.4° C.) for ten minutes. The coated panels are baked in an oven at 400° F. (204.4° C.) for 10 minutes. The thickness of the coating is between 0.22 and 0.26 mils (0.005588 mm and 0.006604 mm).

D. PREPARATION OF COATING

Coatings are prepared by blending 54.505 grams of the aqueous dispersion prepared in Example 4C, with 1.400 grams of CYMEL TM 325 to give a formulation containing 10.27 phr CYMEL TM 325. The formulation is applied and cured as described in Example 5 except that a No. 22 wire wound rod is used instead of the No. 16 wire wound rod. The thickness of the coating is between 0.32 and 0.60 mils (0.008128 mm and 0.01524 mm).

E. PREPARATION OF COATING

Coatings are prepared by blending 50.254 grams of the aqueous dispersion prepared in Example 4B, 1.882 grams of CYMEL TM 325 and 0.7856 grams 2-butoxyethanol to give a formulation containing 15.0 phr CYMEL TM 325. The formulation is applied and cured as described in Example 4C. The thickness of the coating is between 0.215 and 0.27 mils (0.005461 mm and 0.006858 mm).

F. PREPARATION OF COATING

Coatings are prepared by blending 49.707 grams of the aqueous dispersion prepared in Example 4B, 2.478 grams of CYMEL TM 325 and 0.7693 grams 2-butoxyethanol to give a formulation containing 20.0 phr CYMEL TM 325. The formulation is applied and cured as described in Example 4C. The thickness of the boating is between 0.22 and 0.28 mils (0.005588 mm and 0.007112 mm).

G. PREPARATION OF AQUEOUS DISPERSION

The advanced epoxy resin from Example 4A with an epoxide equivalent weight of 2096 (34.2 grams, 0.0163 equivalent), 55.9 grams (0.03185 equiv.) of a diglycidyl ether of bisphenol A having an EEW of 1755, and 17.59 grams (0.1488 mole) of 2-butoxyethanol are added to a reactor of the type described in Example 4A. The nitrogen flow is adjusted to 57 cubic centimeters per minute. The epoxy resin blend is slowly dissolved by heating between 125° C. and 135° C. for a period of thirty minutes. During this time period, the nitrogen adapter which has no dip leg is replaced with one having a three inch dip leg. Then, 1.0107 grams of 85% phosphoric acid in 4.7400 grams ethylene glycol n-butyl ether is added dropwise over a period of 3 minutes while maintaining the reaction temperature at 125° C. The reactor contents are allowed to digest for a period of two hours at 125° C. Then, the nitrogen flow is adjusted to ten cubic centimeters per minute, and 1.8253 grams water is added to the reactor contents. After the temperature is maintained between 114° C. and 125° C. for a period of 124 minutes, the temperature is lowered to 95° C. and the nitrogen flow is increased to about 60 cubic centimeters per minute. Then an aqueous solution of N,N-dimethylethanolamine is added dropwise over a period of six minutes. This solution is prepared by mixing 1.8278 grams of N,N-dimethylethanolamine in 50.1 grams of water. Then, 143.3 grams of deionized water is added to the reactor contents over a twelve minute period while maintaining the temperature between 80° C. and 94° C. The white aqueous dispersion with a non-volatile content of 30 percent is allowed to cool to ambient temperature. Additional deionized water is added to give a dispersion with a non-volatile content of 25.5 percent and pH of 8.95. The viscosity which is measured with a Ford Cup No. 4 is 34.5 seconds. Then 19.74 grams of 2-butoxyethanol is added to give a dispersion having a non-volatile content of 25.5 percent.

H. PREPARATION OF COATING

Coatings are prepared by blending 49.484 grams of the aqueous dispersion prepared in Example 4G, with 1.296 grams of CYMEL TM 325 to give a formulation containing 10.3 phr CYMEL TM 325. The formulation is applied to degreased 24 gauge×4 inches×12 inches (0.66 mm×101.6 mm×304.8 mm) unpolished cleantreated cold rolled steel panels and degreased 7.5 mils×4.5 inches×9.0 inches (0.19 mm×114.3 mm×228.6 mm) tin free steel panels with a No. 16 wire wound rod. The panels are degreased by washing with AROMATIC 100 solvent followed by acetone and drying in an oven at 400° F. for ten minutes. The coated panels are baked in an oven at 400° F. (204.4° C.) for 10 minutes. The thickness of the coating is between 0.21 and 0.23 mils (0.005334 mm and 0.005842 mm).

I. PREPARATION OF COATING

Coatings are prepared by blending 49.249 grams of the aqueous solution prepared in Example 4G, with 1.919 grams of CYMEL TM 325 to give a formulation containing 15.3 phr CYMEL TM 325. The formulation is applied and cured as described in Example 4H. The thickness of the coating is between 0.22 and 0.24 mils (0.005588 mm and 0.006604 mm).

J. PREPARATION OF COATING

Coatings are prepared by blending 53.091 grams of the aqueous solution prepared in Example 4G, with 2.722 grams of CYMEL TM 325 to give a formulation containing 20.1 phr CYMEL TM 325 The formulation is applied and cured as described in Example 4H. The thickness of the coating is between 0.22 and 0.26 mils (0.005588 mm and 0.006604 mm).

EXAMPLE 5

A. PREPARATION OF ADVANCED EPOXY RESIN FROM 1,2,13,14-DIEPOXYTETRADECANE, BISPHENOL A AND THE DIGLYCIDYL ETHER OF BISPHENOL A 1,2,13,14-Diepoxytetradecane (50 grams, 0.38 equivalent) having an EEW of 130.18, 65.98 grams (0.58 equivalent) of bisphenol A, and 0.2143 grams of a 70% by weight solution in methanol of ethyltriphenylphosphonium acetate.acetic acid complex catalyst and 0.04 grams of potassium hydroxide are added to a reactor of the type described in Example 1. The contents are heated with stirring to a temperature of 185° C. over a period of 60 minutes and are continuously reacted at 185° C. for an additional 150 minutes. Fifty grams (0.28 equivalent) of the diglycidyl ether of bisphenol A having an epoxide equivalent weight of 180.14 is then charged into the reactor. The contents are heated with stirring to a temperature of 185° C. over a period of 45 minutes and maintained at 85° C. for a period of 150 minutes. The resultant product has an EEW of 2,067 and a weight average molecular weight of 9,988.

B. PREPARATION OF AQUEOUS DISPERSION

The advanced epoxy resin from Example 5A with an epoxide equivalent weight of 2067 (100 grams, 0.0484 equivalent) and 21.87 grams of 2-butoxyethanol (0.1851 mole) are added to a reactor of the type described in Example 4B. The nitrogen flow is adjusted to 60 cubic centimeters per minute. The epoxy resin is slowly dissolved by heating between 120° C. and 125° C. for a period of thirty minutes. During this time period, the nitrogen adapter which has no dip leg is replaced with one having a three inch dip leg. Then, 1.1309 grams of 85% phosphoric acid in 5.6577 grams of ethylene glycol n-butyl ether is added dropwise over a period of three minutes while maintaining the reaction temperature between 120° C. and 125° C. The reactor contents are allowed to stir for 58 minutes between 120° C. and 130° C. Then, the nitrogen flow is decreased to ten cubic centimeters per minute and 2.259 grams of deionized water is added to the reactor contents. After the temperature is maintained between 115° C. and 124° C. for a period of 2 hours, the temperature is lowered to 81° C. and the nitrogen flow raised to about 60 cubic centimeters per minute. Then an aqueous solution of N,N-dimethylethanolamine is added dropwise over a period of nineteen minutes. This solution is prepared by mixing 2.236 grams N,N-dimethylethanolamine in 50.8 grams of water. Then 139.4 grams of deionized water is added to the reactor contents over a 17 minute period while maintaining the temperature between 82° C. and 92° C. The white aqueous dispersion is allowed to cool to ambient temperature. Additional deionized water is added to give a dispersion with a non-volatile content of 14.6 percent and pH of 9.1. Additional deionized water and 2.8 grams 2-butoxyethanol is added to 560 grams of the aqueous dispersion giving a non-volatile content of 12.9 percent. The viscosity which is measured with a Ford Cup No.4 is 19 seconds.

C. PREPARATION OF COATING

Coatings are prepared by blending 56.030 grams of the aqueous dispersion prepared in Example 5B, 1.102 grams of CYMEL TM 325 and 1.153 grams 2-butoxyethanol to give a formulation containing 15.2 phr CYMEL TM 325. The formulation is applied to degreased 24 gauge×4 inches ×12 inches (0.66 mm×101.6 mm×304.8 mm) unpolished clean-treated cold rolled steel panels and 7.5 mils×4.5 inches×9.0 inches (0.19 mm×114.3 mm×228.6 mm) degreased tin free steel panels with a No. 34 wire wound rod. The panels are degreased by washing the panels in AROMATIC 100 solvent followed by acetone and drying in an oven at 400° F. (204.4° C.). The coated panels are baked in an oven at 400° F. (204.4° C.) for 10 minutes. The thickness of the coating is between 0.16 and 0.20 mils (0.004064 mm and 0.00508 mm).

D. PREPARATION OF COATING

Coatings are prepared by blending 53.770 grams of the aqueous dispersion prepared in Example 5B, 1.390 grams of CYMEL TM 325 and 0.140 grams 2-butoxyethanol to give a formulation containing 20.45 phr CYMEL TM 325. The formulation is applied and cured as described in Example 5C. The thickness of the coating is between 0.16 and 0.21 mils (0.004064 mm and 0.005334 mm).

EXAMPLE 6

A. PREPARATION OF ADVANCED EPOXY RESIN FROM 1,2,7,8-DIEPOXYOCTANE AND BISPHENOL A 1,2,7,8-Diepoxyoctane (68.8 grams, 0.94 equivalent) having an EEW of 73.31, 99.95 grams (0.88 equivalent) of bisphenol A, and 0.1474 grams of a 70 percent by weight solution in methanol of ethyltriphenylphosphonium acetate.acetic acid complex catalyst are added to a reactor of the type described in Example 4A. The contents are heated with stirring to a temperature of 185° C. over a period of 70 minutes and maintained at 185° C. for a period of 4 hours. The resultant product has an EEW of 3,046 and a MWw of 17,600.

B. PREPARATION OF AQUEOUS DISPERSION

The advanced epoxy resin from Example 6A with an epoxide equivalent weight 3046 (110.0 grams, 0.0361 equivalent), and 103.247 (0.8736 mole) grams 2-butoxyethanol is added to a reactor of the type described in Example 4. The nitrogen flow is adjusted to 66 cubic centimeters per minute. The epoxy resin is slowly dissolved by heating between 121° C. and 125° C. for thirty-seven minutes. The nitrogen adapter having no dip leg is replaced with one having a three inch dip leg. Then, 1.0733 grams of 85% phosphoric acid in 5.3582 grams 2-butoxyethanol is added dropwise in a ten minute period while maintaining the reaction temperature between 121° C. and 123° C. The reactor contents are allowed to digest for a period of 90 minutes at 123° C. Then the nitrogen flow is adjusted to ten cubic centimeters per minute, and 2.2230 grams water is added to the reactor contents. After the temperature is maintained between 121° C. and 123° C. for a period of two hours, the solution is cooled to 50° C. and 55.7 grams of 2-butoxyethanol is added to the reactor contents. The solution with a non-volatile content of 40 percent is allowed to cool to ambient temperature. Additional 2-butoxyethanol is added to give a light yellow solution having a non-volatile content of 22 percent. The viscosity which is measured with a Ford Cup No. 4 is 86 seconds.

C. PREPARATION OF COATING

Coatings are prepared by blending 50.857 grams of the solvent-borne solution prepared in Example 6B, with 1.169 grams CYMEL TM 325 to give a formulation containing 10.45 phr CYMEL TM 325. The formulation is applied to degreased 24 gauge×4 inches×12 inches (0.66 mm×101.6 mm×304.8 mm) unpolished clean-treated cold rolled steel panels and degreased 7.5 mils×4.5 inches×9.0 inches (0.19 mm×114.3 mm×228.6 mm) tin free steel panels with a No. 22 wire wound rod. The tin free steel panels are degreased by washing the panels in AROMATIC 100 solvent followed by acetone and drying in an oven at 400° F. (204.4° C.) for 10 minutes. The coated panels are baked in an oven at 400° F. (204.4° C.) for 10 minutes The thickness of the coating is between 0.21 to 0.23 mils (0.005334 mm and 0.005842 mm).

D. PREPARATION OF COATING

Coatings are prepared by blending 51.259 grams of the solvent-borne solution prepared in Example 6B, with 1.696 gram CYMEL TM 325 to give a formulation containing 15.04 phr CYMEL TM 325. The formulation is applied and cured as described in Example 6C. The thickness of the coating is between 0.20 and 0.28 mils (0.00508 mm and 0.007112 mm).

E PREPARATION OF COATING

Coatings are prepared by blending 49.094 grams of the solution prepared in Example 6B, 2.758 grams METHYLON TM 75-108 and 0.066 grams of 10 % BYK 361 in 2-butoxyethanol to give a formulation containing 20.3 weight percent METHYLON TM 75-108. METHYLON TM 75-108 is a mixture of the allyl ethers of mono-, di-, and tri-methylol phenols available from BTL Specialty Resins Corp. BYK 361 is an acrylic copolymer used as a leveling additive which is commercially available from BYK Chemie. The formulation is applied and cured as described in Example 6C. The thickness of the coating is between 0.31 and 0.36 mils (0.007874 mm and 0.009144 mm).

EXAMPLE 7

TESTING OF COATINGS

The coatings are evaluated according to the procedures described in Example 3. The results are provided in Table II.

TABLE II

| Coating | CYMEL TM 325 phr | MEK DR | T-Bend | Rev. Impact In.-Lb. | Rev. Impact J | Avg. Wedge Bends (mm) | Water Pasteurization Adhesion[a] | Water Pasteurization Blush |
|---|---|---|---|---|---|---|---|---|
| Ex. 4C | 10.3 | 22 | T1 | 136 | 15.4 | 15.6 | 5A, 5A | B1 |
| Ex. 4D | 10.3 | 35 | T1 | 160 | 18.1 | 14.1 | 5A, 5A | B1 |
| Ex. 4E | 15.0 | 35 | T1 | 136 | 15.4 | 18.5 | 5A, 5A | B1 |
| Ex. 4F | 19.9 | 80 | T3 | 132 | 14.9 | 24.6 | 5A, 5A | B1 |
| Ex. 4H | 10.3 | 19 | T2 | 116 | 13.1 | 19.4 | 5A, 5A | B4 |
| Ex. 4I | 15.3 | 40 | T3 | 96 | 10.8 | 19.75 | 5A, 5A | B5 |
| Ex. 4J | 20.1 | 50 | T3 | 84 | 9.5 | 24.4 | 5A, 5A | B4 |
| C.E. B* | 10.1 | 10 | T3 | 92 | 10.4 | 20.0 | 5A, 5A | B7 |
| C.E. C* | 15.2 | 45 | T2 | 88 | 9.9 | 20.5 | 5A, 5A | B7 |
| C.E. D* | 20.7 | 200 | T3 | 64 | 7.2 | 27.1 | 5A, 5A | B7 |
| Ex. 5C | 15.2 | 15 | T4 | 72 | 8.1 | 23.0 | 5A, 5A | B1 |
| Ex. 5D | 20.45 | 25 | T4 | 40 | 4.5 | 27.6 | 5A, 5A | B4 |
| Ex. 6C | 10.45 | 50 | T2 | 120 | 13.6 | 20.0 | 5A, 5A | B1 |
| Ex. 6D | 15.04 | 80 | T3 | 100 | 11.3 | 25.8 | 5A, 5A[a] | B1 |
| Ex. 6E | 20.3[b] | 70 | T3 | 124 | 14.0 | 23.9 | 5A, 5A | B1 |

*Not an Example of the present invention.
[a]First value is at unstressed part of coupon; second value is at stressed part of coupon.
[b]Formulated with 20.3 percent Methylon 75-108 as curing agent instead of CYMEL TM 325 and 0.061 percent BYK 361.

What is claimed is:

1. An advanced composition resulting from reacting (1) at least one of (a) at least one epoxidized triglyceride of a fatty acid, or (b) at least one epoxidized fatty acid having an average of more than one unsaturated group per molecule or (c) at least one diepoxyalkane, or (d) any combination of any two or more of (a), (b) or (c), or (e) a combination of any one or more of (a), (b) or (c) and (f) a diglycidyl ether of a dihydric phenol; with (2) a dihydric phenol.

2. An advanced composition of claim 1 wherein said advanced composition is either reacted with or prepared in the presence of (B) a monohydric phenol.

* * * * *